(12) United States Patent
Saito et al.

(10) Patent No.: US 12,515,471 B2
(45) Date of Patent: Jan. 6, 2026

(54) INK JET RECORDING METHOD AND INK JET RECORDING APPARATUS

(71) Applicant: SEIKO EPSON CORPORATION, Tokyo (JP)

(72) Inventors: Toru Saito, Yamagata (JP); Kiyoshi Nakamura, Matsumoto (JP); Toshiyuki Yoda, Matsumoto (JP); Midori Sekine, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 77 days.

(21) Appl. No.: 18/653,089

(22) Filed: May 2, 2024

(65) Prior Publication Data

US 2024/0294024 A1    Sep. 5, 2024

Related U.S. Application Data

(63) Continuation of application No. 17/562,135, filed on Dec. 27, 2021, now Pat. No. 12,036,806.

(30) Foreign Application Priority Data

Dec. 28, 2020    (JP) .................................. 2020-218878

(51) Int. Cl.
*B41M 5/00*    (2006.01)
*B41J 11/00*    (2006.01)
(Continued)

(52) U.S. Cl.
CPC ........ *B41M 5/0023* (2013.01); *B41J 11/0021* (2021.01); *C09D 11/037* (2013.01);
(Continued)

(58) Field of Classification Search
CPC ................ B41M 5/0023; B41M 7/0081; B41J 11/0021; C09D 11/037; C09D 11/101; C09D 11/107; C09D 11/322; C09D 11/38
See application file for complete search history.

(56) References Cited

U.S. PATENT DOCUMENTS

2009/0202795 A1    8/2009 Hayata et al.
2018/0273778 A1*   9/2018 Saito .................... B41M 7/0081

FOREIGN PATENT DOCUMENTS

JP    2007-144683 A    6/2007
JP    2007-231082 A    9/2007
(Continued)

OTHER PUBLICATIONS

Araki, Kenjiro et al., "Active-Ray-Curable Inkjet Recording Method" (WO 2016199589), Dec. 15, 2016, [Disclosure: Tech Problem, Disclosure: Tech Solution, Paragraphs 0002, 0006, Radical Polymerization Initiator: Paragraphs 0001-0003] (Year: 2016).*

*Primary Examiner* — Lisa Solomon
(74) *Attorney, Agent, or Firm* — Harness, Dickey & Pierce, P.L.C.

(57) ABSTRACT

An ink jet recording method includes ejecting a radiation-curable ink jet composition to a recording medium from an ink jet head, and curing the ink jet composition ejected to the recording medium by irradiating with radiation from a LED irradiator having a peak wavelength of 250 to 310 nm to form a cured coating film. The ink jet composition contains a polymerizable compound and an α-hydroxyketone-based initiator.

6 Claims, 2 Drawing Sheets

(51) Int. Cl.
  *C09D 11/037*  (2014.01)
  *C09D 11/101*  (2014.01)
  *C09D 11/107*  (2014.01)
  *C09D 11/322*  (2014.01)
  *C09D 11/38*   (2014.01)

(52) U.S. Cl.
  CPC .......... *C09D 11/101* (2013.01); *C09D 11/107* (2013.01); *C09D 11/322* (2013.01); *C09D 11/38* (2013.01)

(56) References Cited

FOREIGN PATENT DOCUMENTS

| | | |
|---|---|---|
| JP | 2009-096910 A | 5/2009 |
| JP | 2009-185186 A | 8/2009 |
| JP | 2017-001226 A | 1/2017 |
| JP | 2018-086726 A | 6/2018 |
| JP | 2019-099748 A | 6/2019 |
| JP | 2020-007401 A | 1/2020 |
| WO | 2016-199589 A1 | 12/2016 |
| WO | WO-2017056612 A1 * | 4/2017 ............ B41M 7/009 |

* cited by examiner

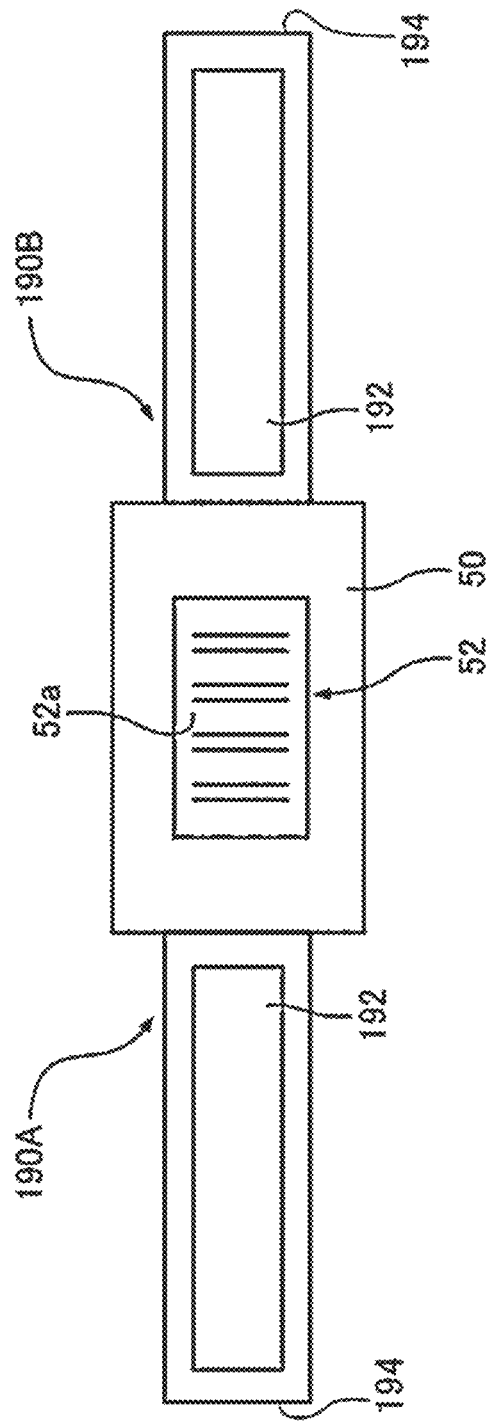

INK JET RECORDING METHOD AND INK JET RECORDING APPARATUS

The present application is a continuation of U.S. patent application Ser. No. 17/562,135 filed Dec. 27, 2021, which is based on, and claims priority from JP Application Serial Number 2020-218878, filed Dec. 28, 2020, the disclosures of which are hereby incorporated by reference herein in their entireties.

BACKGROUND

1. Technical Field

The present disclosure relates to an ink jet recording method and an ink jet recording apparatus.

2. Related Art

Various systems have been used as a recording method of forming an image on a recording medium, such as paper, based on image data signals. Among these, an ink jet system uses an inexpensive apparatus and forms an image directly on a recording medium by ejecting an ink only on a required image portion, and thus the ink can be efficiently used at low running cost. Further, the ink jet system generates small noise and is thus excellent as a recording method.

In an ink jet system recording method, a radiation-curable ink composition (ink jet composition) cured by radiation irradiation has recently been used as an ink composition capable of providing good water resistance, solvent resistance, and scratch resistance, etc.

For example, JP-A-2007-231082 discloses an ink composition for ultraviolet-curable ink jet recording, which contains an acylphosphine oxide (APO)-based initiator as a photopolymerization initiator.

However, an ink jet composition containing an APO-based initiator as a photopolymerization initiator can be preferably cured by a LED irradiator having a peak wavelength of 365 nm to 405 nm, but has a problem that a printed coating film is easily turned yellow and thus has poor color reproducibility (coating film color tone).

On the other hand, when an α-hydroxyketone-based initiator is used as a photopolymerization initiator, a printed coating film is hardly turned yellow, but irradiation with radiation at a peak wavelength near 280 nm is required. Therefore, a lamp with a large size and high heat generation, such as a metal halide lamp, a high-pressure mercury lamp, or the like, is required as a radiation irradiator, thereby causing the problem of heat damage to a recording medium.

Therefore, there is requirement for excellent color reproducibility (coating film color tone) of a printed coating film and for decreased heat damage to a recording medium.

SUMMARY

According to an aspect of the present disclosure, an ink jet recording method includes ejecting a radiation-curable ink jet composition to a recording medium from an ink jet head, and curing the ink jet composition ejected to the recording medium by irradiating with radiation from a LED irradiator having a peak wavelength of 250 to 310 nm to form a cured coating film. The ink jet composition contains a polymerizable compound and an α-hydroxyketone-based initiator.

According to an aspect of the present disclosure, an ink jet recording apparatus includes an ink jet head that ejects a radiation-curable ink jet composition, which contains a polymerizable compound and an α-hydroxyketone-based initiator, to a recording medium, and a LED irradiator having a peak wavelength of 250 to 310 nm.

BRIEF DESCRIPTION OF THE DRAWINGS

FIG. 3 is a view from arrow III-III in FIG. 2.

DESCRIPTION OF EXEMPLARY EMBODIMENTS

Figure 1:
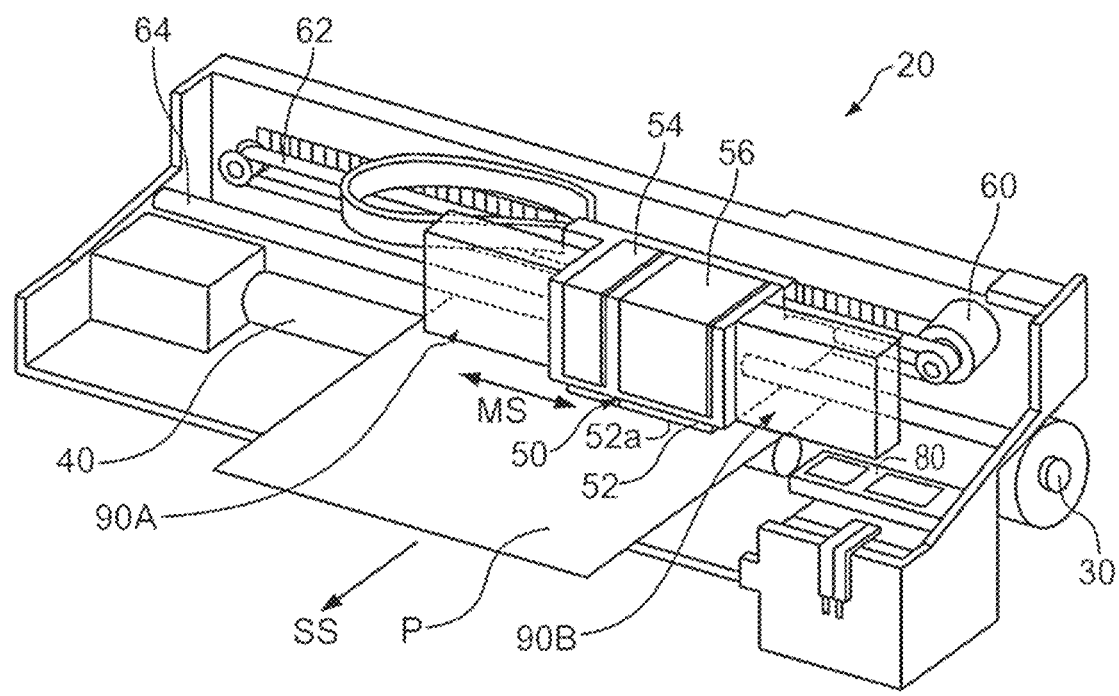
FIG. 1 is a perspective view of an ink jet recording apparatus which can be used for an ink jet recording method according to an embodiment of the present disclosure.

Embodiments of the present disclosure are described below. The embodiments described below are illustrative of the present disclosure. The present disclosure is not limited to the embodiments below and includes various modified embodiments carried out within a range not changing the gist of the present disclosure. All the configurations described below are not necessarily essential configurations of the present disclosure.

1. Ink Jet Recording Method

An ink jet recording method according to an embodiment of the present disclosure is an ink jet recording method including ejecting a radiation-curable ink jet composition to a recording medium from an ink jet head, and curing the ink jet composition ejected to the recording medium by irradiating with radiation from a LED irradiator having a peak wavelength of 250 to 310 nm to form a cured coating film. The ink jet composition contains a polymerizable compound and an α-hydroxyketone-based initiator.

The ink jet recording method according to the embodiment of the present disclosure includes curing by using the LED irradiator having a peak wavelength of 250 to 310 nm, and the irradiator saves energy and thus can irradiate radiation having a peak wavelength of 250 to 310 nm while decreasing heat damage to the recording medium. In addition, the radiation-curable ink jet composition ejected contains the α-hydroxyketone-based initiator, and the initiator causes little yellowing of a coating film and easily absorbs the radiation having the peak wavelength. Therefore, the ink jet recording method according to the embodiment can sufficiently cure a printed coating film and decrease the heat damage to the recording medium, and also can prevent yellowing of the printed coating film.

Each of the processes of the ink jet recording method according to the embodiment is described below.

1.1. Ejection

The ink jet recording method according to the embodiment includes ejecting the radiation-curable ink jet composition to a recording medium from the ink jet head.

1.1.1. Radiation-Curable Ink Jet Composition

The radiation-curable ink jet composition (also referred to as the "ink jet composition" and simply referred to as the "ink" hereinafter) used in the ink jet recording method according to the embodiment contains the polymerizable compound and the α-hydroxyketone-based initiator. Each of the components contained in the ink jet composition is described below.

1.1.1.1. Polymerizable Compound

The radiation-curable ink jet composition used in the ink jet recording method according to the embodiment contains the polymerizable compound. The polymerizable compound can be polymerized singly or by the action of a photopolymerization initiator during radiation irradiation, thereby curing an ink on a recording medium. Usable examples of the polymerizable compound include, but are not particularly limited to, well-known monofunctional, difunctional, and tri- or higher-polyfunctional monomers and oligomers. These polymerizable compounds may be used alone or in combination of two or more. Examples of the polymerizable compound are described below.

The polymerizable compound contains a radical polymerizable compound from the viewpoint of further enhancing the curability of the ink jet composition and from the viewpoint of requiring high versatility and high convenience. In addition to or in place of that, the polymerizable compound preferably contains a polymerizable compound having a vinylether group and a (meth)acrylate group from the viewpoint of enhancing curability and further decreasing the viscosity of the ink jet composition, and when a polymerization initiator is used, from the viewpoint of enhancing the solubility of the polymerization initiator. The polymerizable compound having a vinylether group and a (meth)acrylate group is preferably a radical polymerizable compound having a vinyl ether group and a (meth)acrylate group. Such a polymerizable compound is, for example, (meth)acrylate having a monofunctional or polyfunctional vinylether group, which is preferred from the same viewpoint as described above.

In the present specification, "(meth)acrylic acid" represents both acrylic acid and the corresponding methacrylic acid, and "(meth)acrylate" represents both acrylate and the corresponding methacrylate. In addition, "(meth)acrylic" represents both acrylic and the corresponding methacrylic.

A (meth)acrylate having a vinylether group (also referred to as a "vinyl group-containing (meth)acrylate" hereinafter) is not particularly limited, but preferably contains a compound represented by general formula (I) below from the viewpoint of enabling the composition to have lower viscosity and high flash point and of further enhancing the curability of the composition.

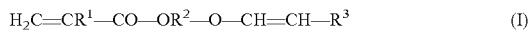

$$H_2C=CR^1-CO-OR^2-O-CH=CH-R^3 \quad (I)$$

In the formula, $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

The vinyl group-containing (meth)acrylate represented by the general formula (I) may be simply referred to as the "compound of the formula (I)" hereinafter.

When the ink jet composition used for the ink jet recording method according to the embodiment of the disclosure contains the compound of the formula (I), there is a tendency to enable the ink jet composition to have excellent curability. Also, when the compound of the formula (I) is contained, there is a tendency to easily suppress the viscosity of the ink jet composition. Further, in order to improve the curability of the ink jet composition, a compound having both a vinylether group and a (meth)acryl group in one molecule is more preferably used than using separately a compound having a vinylether group and a compound having a (meth)acryl group.

The divalent organic residue having 2 to 20 carbon atoms represented by $R^2$ in the general formula (I) is preferably a linear, branched, or cyclic alkylene group having 2 to 20 carbon atoms, which may be substituted; an alkylene group having 2 to 20 carbon atoms and having an oxygen atom of an ether bond and/or ester bond in its structure, which may be substituted; or a divalent aromatic group having 6 to 11 carbon atoms, which may be substituted. Among these, preferably used are alkylene groups having 2 to 6 carbon atoms, such as an ethylene group, a n-propylene group, an isopropylene group, and a butylene group, and alkylene groups having an oxygen atom of an ether bond and 2 to 9 carbon atoms, such as an oxyethylene group, an oxy-n-propylene group, an oxyisopropylene group, and an oxybutylene group. From the viewpoint of enabling the radiation-curable ink jet composition to have lower viscosity and more improved curability, a compound having a glycol ether chain is more preferred, in which $R^2$ is an alkylene group having 2 to 9 carbon atoms and an oxygen atom of an ether bond in its structure, such as an oxyethylene group, an oxy-n-propylene group, an oxyisopropylene group, or an oxybutylene group.

The monovalent organic residue having 1 to 11 carbon atoms represented by $R^3$ in the general formula (I) is preferably a linear, branched, or cyclic alkyl group having 1 to 10 carbon atoms, which may be substituted; or an aromatic group having 6 to 11 carbon atoms, which may be substituted. Among these, preferably used are an alkyl group having 1 to 2 carbon atoms, such as a methyl group or an ethyl group, and an aromatic group having 6 to 8 carbon atoms, such as a phenyl group or a benzyl group.

When each of the organic residues described above is a group which may be substituted, substituents thereof are divided into a group containing carbon atoms and a group not containing carbon atoms. When a substituent is a group containing carbon atoms, the carbon atoms are counted in the number of carbon atoms of the organic residue. Examples of the group containing carbon atoms include, but are not limited to, a carboxyl group and an alkoxy group. Examples of the group not containing carbon atoms include, but are not limited to, a hydroxyl group and a halo group.

The content of the compound of the formula (I) relative to the total amount (100% by mass) of the ink jet composition is preferably 1% by mass or more and 50% by mass or less, more preferably 10% by mass or less and 50% by mass or less, still more preferably 10% by mass or more and 35% by mass or less, and particularly preferably 10% by mass or more and 25% by mass or less. When the content of the compound of the formula (I) is 1% by mass or more, particularly preferably 10% by mass or more, there is a tendency to enable the ink jet composition to have lower viscosity and enable the ink jet composition to have more excellent curability. While when the content is 50% by mass or less, there is a tendency to enable the storage property of an ink to be maintained in an excellent state.

Example of the compound of the formula (I) include but are not particularly limited to, 2-vinyloxyethyl (meth)acrylate, 3-vinyloxpropyl (meth)acrylate, 1-methy-1-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexyl methyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl methacrylate, 2-(2-vinyloxyethoxy)ethyl acrylate (VEEA), 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)acrylate.

Among these, because of enabling the radiation-curable ink jet composition to have lower viscosity and high flash point and because of excellent curability of the ink jet composition, at least any one of 2-(vinyloxyethoxy)ethyl (meth)acrylate, that is 2-(vinyloxyethoxy)ethyl acrylate and 2-(vinyloxyethoxy)ethyl methacrylate, is preferred, and 2-(vinyloxyethoxy)ethyl acrylate is more preferred. Both 2-(vinyloxyethoxy)ethyl acrylate and 2-(vinyloxyethoxy)ethyl methacrylate have a simple structure and a low molecular weight, and thus can significantly decrease the viscosity of the radiation-curable ink jet composition. Examples of 2-(vinyloxyethoxy)ethyl (meth)acrylate include 2-(2-(vinyloxyethoxy)ethyl (meth)acrylate and 2-(1-vinyloxyethoxy)ethyl (meth)acrylate. Examples of 2-(vinyloxyethoxy)ethyl acrylate include 2-(2-vinyloxyethoxy)ethyl acrylate and 2-(1-vinyloxyethoxy)ethyl acrylate. Further, 2-(vinyloxyethoxy)ethyl acrylate is more excellent in curability than 2-(vinyloxyethoxy)ethyl methacrylate.

The content of the vinylether group-containing (meth)acrylate esters, particularly 2-(vinyloxyethoxy)ethyl (meth)acrylate, relative to the total amount (100% by mass) of the ink jet composition is preferably 10% by mass or more and 70% by mass or less and more preferably 20% by mass or more and 50% by mass or less. With the content of 10% by mass or more, the viscosity of the radiation-curable ink jet composition may be decreased, and the radiation-curable ink jet composition may have more excellent curability. While with the content of 70% by mass or less, the storage property of the ink jet composition may be more improved, and the surface luster of a recorded matter may be improved.

In the present embodiment, the ink jet composition may contain one or two or more monofunctional or difunctional or tri- or higher-polyfunctional monomers other than the above examples. Examples of such monomers include, but are not particularly limited to, unsaturated carboxylic acids such as (meth)acrylic acid, itaconic acid, crotonic acid, isocrotonic acid, and maleic acid; salts of the unsaturated carboxylic acids; unsaturated carboxylic acid esters, urethanes, amides, and anhydrides; acrylonitrile; styrene; various unsaturated polyesters; unsaturated polyethers; unsaturated polyamides; and unsaturated urethanes.

In addition, a N-vinyl compound may be contained as another monofunctional monomer or polyfunctional monomer. Examples of the N-vinyl include, but are not particularly limited to, N-vinylformamide. N-vinylcarbazole, N-vinylacetamide, N-vinylpyrrolidone, N-vinylcaprolactam, and acryloylmorpholine, and derivatives thereof.

The ink jet composition may contain monofunctional (meth)acrylate as the monofunctional monomer. In this case, the ink jet composition has low viscosity, and the photopolymerization initiator and other additives have excellent solubility, and also ejection stability can be easily obtained during ink jet recording. Examples of the monofunctional (meth)acrylate include, but are not particularl6y limited to, isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 4-hydroxybutyl acrylate, lactone-modified flexible (meth)acrylate, tert-butylcyclohexyl (meth)acrylate, dicyclopentanyl (meth)acrylate, dicyclopentenyloxyethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, polypropylene glycol monovinyl ether (meth)acrylate, and cyclic trimethylolpropane formal (meth)acrylate. Among these, phenoxyethyl (meth)acrylate, isobornyl (meth)acrylate, and cyclic trimethylolpropane formal (meth)acrylate are preferred. When such a compound is used as the monofunctional monomer, there is a tendency to improve curability, and the amount of the photopolymerization initiator, which may cause coloring, can be decreased, thereby sometimes causing more excellent coating film color tone.

The content of the monofunctional monomer relative to the total amount (100% by mass) of the ink jet composition is preferably 10% by mass or more and 80% by mass or less and more preferably 20% by mass or more and 60% by mass or less. With the content within the preferred range described above, there is a tendency to more improve curability, initiator solubility, storage stability, and ejection stability.

The ink jet composition may contain polyfunctional (meth)acrylate as the polyfunctional monomer. Examples of difunctional (meth)acrylate include, but are not particularly limited to, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A EO (ethylene oxide) adduct di(meth)acrylate, bisphenol A PO (propylene oxide) adduct di(meth)acrylate, hydroxypivalic acid neopentyl glycol di(meth)acrylate, polytetramethylene glycol di(meth)acrylate, diethylene glycol di(meth)acrylate, and triethylene glycol di(meth)acrylate.

Examples of tri- or higher-functional (meth)acrylate include trimethylolpropane tri(meth)acrylate, EO-modified trimethylolpropane tri(meth)acrylate, pentaerythritol tri (meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritol ethoxy tetra(meth)acrylate, and caprolactone-modified dipentaerythritol hexa(meth)acrylate.

Among these, preferred are dipropylene glycol di(meth)acrylate, tripropylene glycol di(meth)acrylate, diethylene glycol di(meth)acrylate, triethylene glycol di(meth)acrylate, pentaerythritol tri(meth)acrylate, and dipentaerythritol hexa(meth)acrylate, and more preferred are dipropylene glycol di(meth)acrylate and dipentaerythritol hexa(meth)acrylate.

The content of the polyfunctional monomer relative to the total amount (100% by mass) of the ink jet composition is preferably 60% by mass or less, more preferably 50% by mass or less, and still more preferably 40% by mass or less. With the content within the range described above, there is a tendency to more improve curability, storage stability, ejection stability, and surface luster of a printed material.

In order to increase the toughness, heat resistance, and chemical resistance of a cured film, monofunctional (meth)acrylate and polyfunctional (meth)acrylate are preferably used in combination. In particular, phenoxyethyl (meth)acrylate, isobornyl (meth)acrylate, dipropylene glycol di(meth)acrylate, and dipentaerythritol hexa(meth)acrylate are more preferably used in combination.

In order to improve the adhesion, toughness, and the like of a cured film, a monofunctional or dii- or higher-polyfunctional oligomer may be contained. Examples of the type of an oligomer include, but are not particularly limited to, various oligomers such as an acrylic oligomer formed of an acrylic monomer, a styrene-acrylic oligomer formed of styrene and an acrylic monomer, an aliphatic, alicyclic, or aromatic urethane acrylate oligomer, an epoxy acrylate oligomer, a polyester acrylate oligomer, and the like. These are together referred to as the "acrylate oligomer". The content of the acrylate oligomer is preferably 3% by mass or more and less than 30% by mass, more preferably 5% by mass or more and less than 25% by mass. With the content equal to or higher than the lower limit, the adhesion and toughness of a cured film are improved, while with the content equal to or lower than the upper limit, the ink viscosity is preferably deceased, and the ejection property may be improved.

The content of the polymerizable compound relative to the total amount (100% by mass) of the ink jet composition is preferably 35% by mass or more and 95% by mass or less and more preferably 45% by mass or more and 90% by mass or less. When the content of the polymerizable compound is within the range described above, there is a tendency that viscosity and odor can be decreased, and the solubility and reactivity of the photopolymerization initiator and the surface luster of a printed material can be improved.

1.1.1.2. Photopolymerization Initiator

The radiation-curable ink jet composition used in the ink jet recording method according to the embodiment of the present disclosure contains an α-hydroxyketone-based initiator as the photopolymerization initiator. The use of the α-hydroxyketone-based initiator can prevent yellowing of a recorded matter and thus enables recording with an excellent coating film color tone.

The α-hydroxyketone-based initiator represents a photopolymerization initiator having an α-hydroxyketone structure in its molecule. Examples of the α-hydroxyketone-based initiator include 2-hydroxy-1-(4-(4-(2-hydroxy-2-methylpropionyl)-benzyl)-phenyl)-2-methyl-propane, 1-(4-(2-hydroxyethoxy)-phenyl)-2-hydroxy-methylpropanone, oligo (2-hydroxy-2-methyl-1-(4-(1-methylvinyl)phenyl) propanone, 2-hydroxy-1-[4-{4-(2-hydroxy-2-methylpropanoyl)phenoxy}phenyl]-2-methylpropan-1-one, 1-hydroxycyclohexyl phenyl ketone, 2,2-dimethoxy-2-phenyl acetophenone, and 2-hydroxy-2-methoxypropiophenone, and the like.

Among these, an α-hydroxyketone-based initiator having a molecular weight of 210 or more is preferred. That is, the α-hydroxyketone-based initiator is preferably 2-hydroxy-1-(4-(4-(2-hydroxy-2-methyl-propionyl)-benzyl)-phenyl)-2-methyl-propane (molecular weight: 340), 1-(4-(2-hydroxyethoxyl)-phenyl)-2-hydroxy-methylpropanone (molecular weight: 224), oligo (2-hydroxy-2-methyl-1-(4-(1-methylvinyl)phenyl)propanone (molecular weight: 483), or 2-hydroxy-1-[4-{4-(2-hydroxy-2-methylpropanoyl) phenoxy}phenyl]-2-methylpropan-1-one (molecular weight: 342). The molecular weight of the α-hydroxyketone-based initiator is more preferably 300 or more, still more preferably 400 or more, and particularly preferably 450 or more. When the molecular weight of the α-hydroxyketone-based initiator is within the range described above, there is a tendency that the occurrence of odor from a printed coating film can be decreased. Also, there is a tendency that migration of the photopolymerization initiator remaining in the printed coating film can be decreased.

Examples of commercial products of the α-hydroxyketone-based initiator include Omnirad 127 (trade name, manufactured by IGM Resins B. V., 2-hydroxy-1-(4-(4-(2-hydroxy-2-methyl-propionyl)-benzyl)-phenyl)-2-methyl-propane), Omnirad 2959 (trade name, manufactured by IGM Resins B.V., 1-(4-(2-hydroxyethoxyl)-phenyl)-2-hydroxymethylpropanone), ESACURE KIP 150 (trade name, manufactured by Lamberti Inc., oligo (2-hydroxy-2-methyl-1-(4-(1-methylvinyl)phenyl)propanone), ESACURE KIP 160 (trade name, manufactured by Lamberti Inc., 2-hydroxyl-[4-{4-(2-hydroxy-2-methylpropanoyl)phenoxy}phenyl]-2-methylpropan-1-one), Omnirad 184 (trade name, manufactured by IGM Resins B.V., 1-hydroxycyclohexyl phenyl ketone), Omnirad 651 (trade name, manufactured by IGM Resins B.V., 2,2-dimethoxy-2-phenylacetophenone), Omnirad 1173 (trade name, manufactured by IGM Resins B.V., 2-hydroxy-2-methoxypropiophenone), and the like.

The lower limit of the content of the α-hydroxyketone-based initiator relative to the total amount (100% by mass) of the ink jet composition is preferably 4% by mass or more, more preferably 6% by mass or more, and still more preferably 7.5% by mass or more. The upper limit of the content of the α-hydroxyketone-based initiator relative to the total amount (100% by mass) of the ink jet composition is preferably 20% by mass or less, more preferably 15% by mass or less, and still more preferably 10% by mass or less. When the content of the α-hydroxyketone-based initiator is within the range described above, the curing rate may be sufficiently increased, and the occurrence of odor may be decreased due to a small amount of the α-hydroxyketone-based initiator remaining undissolved.

Other Photopolymerization Initiator

The radiation-curable ink jet composition used in the ink jet recording method according to the embodiment of the present disclosure may contain a photopolymerization initiator other than the α-hydroxyketone-based initiator. The other photopolymerization initiator is not particularly limited as long as it generates active species such as radicals and cations by irradiation with active radiation and initiates polymerization reaction of the polymerizable compound. A photo-radical polymerization initiator and a photo-cationic polymerization initiator can be used as the other photopolymerization initiator, but the photo-radical polymerization initiator is preferably used.

The use of ultraviolet light (UV) among radiations can exhibit excellent safety and suppress the cost of an irradiation section. Therefore, the other photopolymerization initiator preferably has an absorption peak in the ultraviolet region.

Examples of the photo-radical polymerization initiator include aromatic ketones, acylphosphine oxide compounds, aromatic onium salt compounds, organic peroxides, thio compounds (thioxanthone compounds, thiophenyl group-containing compounds, and the like), hexaarylbiimidazole compounds, ketoxime ester compounds, borate compounds, azinium compounds, metallocene compounds, active ester compounds, compounds having a carbon-halogen bond, and alkylamine compounds.

Among these, at least one selected from acylphosphine oxide compounds and thioxanthone compounds is preferred, and an acylphosphine oxide compound and a thioxanthone compound may be used in combination.

Among the acylphosphine oxide compounds, 2,4,6-trimethylbenzoyl diphenylphosphine oxide and bis(2,4,6-trimethylbenzoyl)phenylphosphine oxide are more preferred. These photopolymerization initiators may be used in combination.

In view of compatibility with the polymerizable compound, 2,4,6-trimethylbenzoyl diphenylphosphine oxide is preferred. Examples of 2,4,6-trimethylbenzoyl diphenylphosphine oxide include "Speed Cure TPO" (trade name, manufactured by BASF Japan Ltd.). Also, bis(2,4,6-trimethylbenzoyl)phenylphosphine oxide is preferred in view of having a wide range of light absorption characteristics. Examples of bis(2,4,6-trimethylbenzoyl)phenylphosphine oxide include "IRGACURE 819" (trade name, manufactured by BASF Japan Ltd.).

Specific examples of the photo-radical polymerization initiator include acetophenone, acetophenone benzyl ketal, xanthone, fluorenone, benzaldehyde, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethythioxanthone, 2-isopropylthioxanthone, 2-chlorothioxanthone, 2-methyl-1-[4-(methylthio)phenyl]-2-morpholino-propan-1-one, bis(2,4,6-trimethylbenzoyl)-phenylphosphine oxide, 2,4,6-trimethylbenzoyl-diphenylphosphine oxide, 2,4-diethylthioxanthone, and bis-(2,6-dimethoxybenzoyl)-2,4,4-trimethylpentyl phosphine oxide.

Examples of commercial products of the photo-radical polymerization initiator include IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), Omnirad 379 (2-(dimethylamino)-2-[(4-methylphenyl)methyl]-1-[4-(4-morpholinyl)phenyl]-1-butanone), DAROCUR TPO (2,4,6-trimethylbenzoyl-diphenylphosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1.2-oxtanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), IRGACURE 754 (mixture of oxyphenyl acetic acid, 2-[2-oxo-2-phenylacetoxyethoxy] ethyl ester and oxyphenyl acetic acid, 2-(2-hydroxyethoxy)ethyl ester), Lucirin TPO, LR8893, and LR8970 (the above manufactured by BASF Japan Ltd.), KAYACURE DETX-S (2,4-diethylthioxanthone) (manufactured by Nippon Kayaku Co., Ltd.), Ebecryl P36 (manufactured by UCB, Inc.), Speedcure TPO (diphenyl-2,4,6-trimethylbenzoyl phosphine oxide) and Speedcure TPO (diphenyl-(2,4,6-trimethylbenzoyl)phosphine oxide) (the above manufactured by Lambson Inc.), and the like.

The photopolymerization initiators may be used alone or in combination of two or more.

The upper limit of the content of the photopolymerization initiator other than the α-hydroxyketone-based initiator relative to the total amount (100% by mass) of the ink jet composition is preferably 5% by mass or less, more preferably 3% by mass or less, still more preferably 1% by mass or less, and particularly preferably 0% by mass. When the content of the photopolymerization initiator other than the α-hydroxyketone-based initiator is within the range described above, there is a tendency that yellowing of a printed coating film can be prevented, thereby causing excellent coating film color tone.

1.1.1.3. Coloring Material

The radiation-curable ink jet composition used in the ink jet recording method according to the embodiment of the disclosure may contain a coloring material. At least one of a pigment and a dye can be used as the coloring material.

Either an inorganic pigment or an organic pigment can be used as the pigment.

Examples of an inorganic pigment include carbon black (C. I. Pigment Black 7) such as furnace black, lamp black, acetylene black, channel black, and the like, iron oxide, and titanium oxide.

Examples of an organic pigment include azo pigments such as an insoluble azo pigment, a condensed azo pigment, an azo lake, a chelate azo pigment, and the like; polycyclic pigments such as a phthalocyanine pigment, perylene and perinone pigments, an anthanthrone pigment, a quinacridone pigment, a dioxane pigment, a thioindigo pigment, an isoindolinone pigment, a quinophthalone pigment, and the like; dye chelates (for example, a basic dye-type chelate, an acid dye-type chelate, and the like); dye lakes (a basic dye-type lake, an acid dye-type lake, and the like); a nitro pigment, a nitroso pigment, aniline black, a sunlight fluorescent pigment.

In further detail, examples of the carbon black used in a black ink include No. 2300, No. 900, MCF88, No. 33, No. 40, No. 45, No. 52, MA7, MA8, MA100, No. 2200B, and the like (the above manufactured by Mitsubishi Chemical Corporation), Raven 5750, Raven 5250, Raven 5000, Raven 3500, Raven 1255, Raven 700, and the like (the above manufactured by Carbon Columbia Ltd.), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K.K.), and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (the above manufactured by Degussa Ltd.).

Examples of a pigment used for a white ink include C. I. Pigment White 6, 18, and 21.

Examples of a pigment used for a yellow ink include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of a pigment used for a magenta ink include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C. I. Pigment Violet 19, 23, 32, 33, 36, 38, 43, and 50.

Examples of a pigment used for a cyan ink include C. I. Pigment Blue 1, 2, 3, 15, 15:1, 15:2, 15:3, 15:34, 15:4, 16, 18, 22, 25, 60, 65, and 66, and C. I. Vat Blue 4 and 60.

Examples of a pigment other than magenta, cyan, and yellow include C. I. Pigment Green 7 and 10, C. I. Pigment Brown 3, 5, 25, and 26, and C. I. Pigment Orange 1, 2, 5, 7, 13, 14, 15, 16, 24, 34, 36, 38, 40, 43, and 63.

The pigments may be used alone or in combination of two or more, but the radiation-curable ink jet composition used for the ink jet recording method according to the embodiment is preferably a white ink containing a pigment used in a white ink. The white ink is white and thus color reproducibility easily deteriorates due to conspicuous yellowing of a printed coating film. However, the ink jet recording method according to the embodiment of the present disclosure can achieve excellent coating film color tone even with such a white ink.

In the present specification, the term "white" of a white ink represents not only "complete white" but also a color colored in a chromatic or achromatic color and a color with luster within a range in which it is visible as white. Examples of a white ink include those sold as names that indicate a white ink. In a more quantitative sense, for example, in CIELAB, the "white" includes not only a color with an L* value of 100 but also a color with an L*of 80 or more and 100 or less and a*and b* values of ±10 or less each. More specifically, a color ink is adhered in a sufficient adhesion amount to a transparent recording medium, and a value obtained by measuring the color of the adhesion region in a reflection mode using a colorimeter according to CIELAB is within the range described above. For example, when the sufficient adhesion amount is 15 mg/cm$^2$, the ink is regarded as the white ink.

When the pigment described above is used, the average particle diameter thereof is preferably 500 nm or less and more preferably 50 to 300 nm. The average particle diameter within the range described above can exhibit the more excellent reliability of ejection stability and dispersion stability of the ink jet composition and can also form an image with excellent quality. In the present specification, the average particle diameter is measured by dynamic light scattering.

The dye is not particularly limited, and an acid dye, a direct dye, a reactive dye, and a basic dye can be used. Examples of the dye include C. I. Acid Yellow 17, 23, 42, 44, 79, and 142, C. I. Acid Red 52, 80, 82, 249, 254, and 289, C. I. Acid Blue 9, 45, and 249, C. I. Acid Black 1, 2, 24, and 94, C. I. Food Black 1 and 2, C. I. Direct Yellow 1, 12, 24, 33, 50, 55, 58, 86, 132, 142, 144, and 173, C. I. Direct Red 1, 4, 9, 80, 81, 225, and 227, C. I. Direct Blue 1, 2, 15, 71, 86, 87, 98, 165, 199, and 202, C. I. Direct Black 19, 38, 51, 71, 154, 168, 171, and 195, C. I. Reactive Red 14, 32, 55, 79, and 249, and C. I. Reactive Black 3, 4, and 35.

The dyes may be used alone or in combination of two or more.

The content of the coloring material relative to the total amount (100% by mass) of the ink jet composition is preferably 1.2% by mass or less, more preferably 1.0% by mass or less, and still more preferably 0.8% by mass or less. The content of 0% by mass, that means not containing the coloring material, is considered as containing. When the content of the coloring material is within the range described above, color reproducibility easily deteriorates due to conspicuous yellowing of a printed coating film, but the ink jet recording method according to the embodiment of the disclosure can obtain excellent coating film color tone even with such an ink.

Dispersant

When the ink jet composition contains the pigment, a dispersant may be further contained in order to improve pigment dispersibility. Examples of the dispersant include, but are not particularly limited to, dispersants such as a polymer dispersant and the like commonly used for adjusting a pigment dispersion. Specific examples thereof include dispersants, each containing as a main component one or more of polyoxyalkylene polyalkylene polyamine, vinyl-based polymer and copolymer, acrylic polymer and copolymer, polyester, polyamide, polyimide, polyurethane, an amino-based polymer, a silicon-containing polymer, a sulfur-containing polymer, and an epoxy resin. Examples of a commercial product of the polymer dispersant include Ajisper Series manufactured by Ajinomoto Fine-Techno Co., Ltd., Solsperse Series (Solsperse 36000 and the like) available from Avecia Inc. and Noveon Inc., Disper BYK Series (BYK180 and the like) manufactured by BYK Additives & Instruments Inc., and Disparlon Series manufactured by Kusumoto Chemicals Co., Ltd.

1.1.1.4. Other Component

The radiation-curable ink jet composition used for the ink jet recording method according to the embodiment of the disclosure may contain a surfactant and a polymerization inhibitor as other components.

Surfactant

The surfactant is preferably a silicone-based surfactant and more preferably a polyester-modified silicone or polyether-modified silicone. Examples of the polyester-modified silicone include BYK-347 and 348, BYK-UV3500, 3510, and 3530 (the above manufactured by BYK Additives & Instruments Inc.) and the like, and examples of the polyether-modified silicone include BYK-3570 (manufactured by BYK Additives & Instruments Inc.) and the like. The surfactants may be used alone or in combination of two or more.

Polymerization Inhibitor

The polymerization inhibitor is preferably a hindered amine compound. Examples of other polymerization inhibitors include, but are not limited to, p-methoxyphenol, hydroquinone monomethyl ether (MEHQ), hydroquinone, cresol, tert-butylcatechol, 3,5-di-tert-butyl-4-hydroxytoluene, 2,2'-methylene bis (4-methyl-6-tert-butylphenol), 2,2'-methylene bis(4-ethyl-6-butylphenol), 4,4'-thiobis(3-methyl-6-tert-butylphenol), and 2,2,6,6-tetramethyl-4-hydroxypiperidin-1-oxyl (trade name "LA-7RD", manufactured by ADEKA Corporation). The polymerization inhibitors may be used alone or in combination of two or more.

The content of the polymerization inhibitor relative to the total amount (100% by mass) of the ink jet composition is preferably 0.05% by mass or more and 0.5% by mass or less and more preferably 0.1% by mass or more and 0.5% by mass or less.

1.1.1.5. Physical Properties

The viscosity at 20° C. of the radiation-curable ink jet composition used for the ink jet recording method according to the embodiment of the disclosure is preferably 25 mPa·s or less and more preferably 5 to 20 mPa·s. When the viscosity at 20° C. of the radiation-curable ink jet composition is within the range described above, a proper amount of the ink jet composition can be ejected from nozzles, and flying bend and scattering of the ink jet composition can be more decreased, thereby enabling the preferred use for an ink jet recording apparatus. The viscosity can be measured in an environment of 20° C. by reading the viscosity at a shear rate of 200 while increasing the shear rate from 10 to 1000 using a viscoelasticity tester MCR-300 (manufactured by Physica, Inc.).

The surface tension at 20° C. of the radiation-curable ink jet composition used for the ink jet recording method according to the embodiment of the disclosure is preferably 20 mN/m or more and 30 mN/m or less. When the surface tension at 20° C. of the radiation-curable ink jet composition is within the range described above, the ink jet composition hardly wets the nozzles after waste liquid treatment. Therefore, a proper amount of the ink jet composition can be ejected from nozzles, and flying bend and scattering of the ink jet composition can be more decreased, thereby enabling the preferred use for an ink jet recording apparatus. The surface tension can be measured by observing the surface tension using an automatic surface tensiometer CBVP-Z (manufactured by Kyowa Interface Science Co., Ltd.) when a platinum plate is wetted with an ink in an environment of 20° C.

1.1.1.6. Method for Ejecting Ink Jet Composition

The radiation-curable ink jet composition used for the ink jet recording method according to the embodiment of the disclosure is ejected to a recording medium from an ink jet head. An ink jet recording apparatus provided with an ink jet head which ejects the ink jet composition is described later.

1.1.2. Recording Medium

The recording medium used in the ink jet recording method according to the embodiment may be one having or not having a recording surface absorbing a liquid such as an ink. Therefore, examples of the recording medium include, but are not particularly limited to, absorptive recording media such as paper, a film, a cloth, and the like, low-absorptive recording media such as print book paper and the like, and non-absorptive recording media such as a polymer and the like.

A low-absorptive recording medium or non-absorptive recording medium represents a recording medium having the property of completely not absorbing or substantially not absorbing a liquid such as an ink. In a quantitative sense, the low-absorptive recording medium or non-absorptive recording medium represents a recording medium having a water absorption amount of 10 mL/m² or less from the start of contact to 30 msec$^{1/2}$ in a Bristow method. The Bristow method is most popularized as a method for measuring a liquid absorption amount within a short time, and is used in "Japan Technical Association of the Pulp and Paper Industry" (JAPAN TAPPI). The details of the test method are described in "Standard No. 51-Paper and Paperboard—Liquid Absorption Test Method—Bristow Method" of JAPAN TAPPI PAPER AND PULP TEST METHODS, 2000. On the other hand, the liquid absorptive recording medium represents a recording medium not corresponding to the low-absorptive recording medium and non-absorptive recording medium.

Example of the non-absorptive recording medium include a medium including paper or the like as a substrate coated with plastic, a medium including paper or the like as a substrate bonded to a plastic film, a plastic film not having an absorption layer (receiving layer), and the like. Herein, examples of the plastic include films and plates of polymers such as polyvinyl chloride, polyethylene terephthalate, polycarbonate, polystyrene, polyurethane, polyethylene, polypropylene, polyvinyl acetal, and a blend composition of two or more of these, and films and plates of dicellulose acetate, cellulose triacetate, cellulose propionate, cellulose butyrate, cellulose acetate butyrate, cellulose nitrate, and the like.

The recording medium may be colorless transparent, translucent, colored transparent, chromatic opaque, achromatic opaque, or the like. Also, the recording medium itself may be colored or translucent or transparent.

The recording medium used in the ink jet recording method according to the embodiment of the disclosure is preferably the non-absorptive recording medium. The non-absorptive recording medium including plastic or the like, particularly the non-absorptive recording medium including polyethylene terephthalate or polypropylene, is easily thermally damaged and easily shrinks. However, even with the non-absorptive recording medium, the ink jet recording method according to the embodiment of the disclosure can prevent yellowing of a printed coating film while preventing thermal deterioration of the recording medium.

1.2. Curing

The ink jet recording method according to the embodiment of the disclosure includes curing the ink jet composition ejected to the recording medium by irradiation with radiation having a peak wavelength of 250 to 310 nm from the LED irradiator, thereby forming a cured coating film. Described below is the ink jet recording apparatus which can be used in the ink jet recording method according to the embodiment of the disclosure and is provided with the LED irradiator having a peak wavelength of 250 to 310 nm and the ink jet head.

1.2.1. Configuration of Ink Jet Recording Apparatus

Described below is an ink jet recording apparatus according to an embodiment of the present disclosure, which can be used in the ink jet recording method according to the embodiment of the disclosure. An ink jet recording apparatus which can be used in the ink jet recording method according to the embodiment of the disclosure incudes an ink jet head and a LED irradiator having a peak wavelength of 250 to 310 nm.

Figure 2:
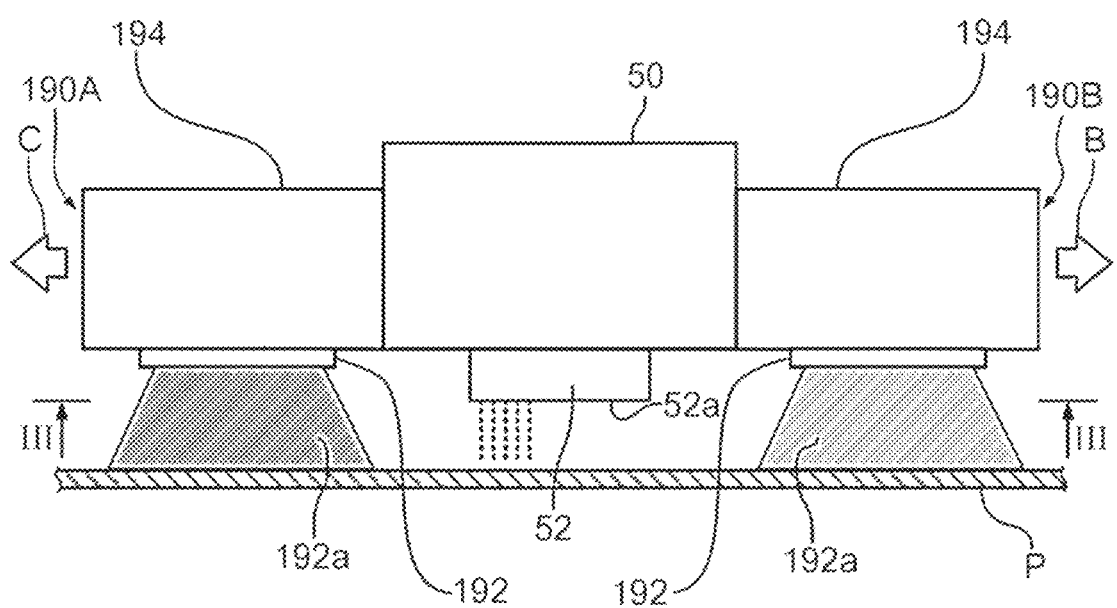
FIG. 2 is a front view of a radiation irradiation device shown in FIG. 1.

An example of the ink jet recording apparatus which can be used in the ink jet recording method according to the embodiment of the disclosure is shown in FIG. 1. FIG. 1 is a perspective view of an ink jet recording apparatus which can be used in the ink jet recording method according to the embodiment of the disclosure. FIG. 2 is a front view showing radiation irradiation devices 90A (corresponding to 190A in FIG. 2) and 90B (corresponding to 190B in FIG. 2) shown in FIG. 1. FIG. 3 is a view from arrow III-III in FIG. 2.

An ink jet recording apparatus 20 shown in FIG. 1 includes a motor 30 which feeds a recording medium P in the sub-scanning direction SS, a platen 40, an ink jet head 52 which jets a radiation-curable ink as droplets with a minimum particle diameter from head nozzles and ejects the droplets on the recording medium P, a carriage 50 loaded with the ink jet head 52, a carriage motor 60 which moves the carriage 50 in the main scanning direction MS, and a pair of radiation irradiation devices 90A and 90B which irradiate radiation to the droplets of the radiation-curable ink ejected from the ink jet head 52 and adhered to the recording medium P.

The carriage 50 is towed by a towing belt 62 driven by the carriage motor 60 and is moved along a guide rail 64.

The ink jet head 52 is loaded on the carriage 50 and is moved in the main scanning direction MS in association with the operation of the carriage 50 in the moving direction (also referred to as the "main scanning direction" hereinafter) MS.

Also, the ink jet head 52 can eject the radiation-curable ink jet composition. In the example shown in FIG. 1, the ink jet head 52 is a serial type head for full color printing, which jets four color inks and which is provided with many head nozzles for each of the colors. The carriage 50 loaded with the ink jet head 52 is loaded with, besides the ink jet head 52, a black cartridge 54 as a black ink container that contains a black ink to be supplied to the ink jet head 52, and a color ink cartridge 56 as a color ink container that contains a color ink to be supplied to the ink jet head 52. The ink contained in each of the cartridges 54 and 56 is a radiation-curable ink jet composition.

In the ejection according to the embodiment of the disclosure, the amount of droplets ejected from the ink jet head 52 is preferably 1 pl or more and 20 pl or less. With the droplet amount within the range described above, ejection stability is improved, and a high-quality image can be obtained.

In addition, a capping device 80 is provided at the home position (the position on the right side of FIG. 1) in order to seal the nozzle surface 52a of the ink jet head 52 during stopping. When the carriage 50 reaches above the capping device 80 at the finish of a printing job, the capping device 80 is automatically moved upward by a mechanism not shown to seal the nozzle surface 52a of the ink jet head 52. The capping prevents drying and degradation of the ink in the nozzles.

Although not shown in the drawings, a wipe unit may be provided at the home position (the position on the right side of FIG. 1) of the carriage 50 in order to wipe the nozzle surface 52a of the ink jet head 52 during stopping. The wipe unit is provided at a position not interring with the capping device 80 so that the droplets, mist, and/or cured products thereof, which adhere to the nozzle surface 52a, can be removed by rubbing the nozzle surface 52a, in which the nozzles of the ink jet head 52 are formed, with a squeegee-shaped wiper blade.

By using the ink jet recording apparatus 20, the droplets of the radiation-curable ink jet composition can be ejected and adhered to the recording medium. In addition, the ink jet recording apparatus 20 enables continuous ejection and curing by using one device without using separate devices for ejection and curing.

The radiation is not particularly limited as long as it has a peak wavelength of 250 nm or more and 310 nm or less. An example of an irradiation unit capable of radiation irradiation is a radiation irradiation device shown in FIG. 1 and FIG. 2.

As shown in FIG. 1 or FIG. 3, radiation irradiation devices 190A and 190B are provided at both ends along the moving direction of the carriage 50.

As shown in FIG. 2, the radiation irradiation device 190A provided on the left side of the ink jet head 52 irradiates radiation to the droplets ejected on the recording medium P during rightward scanning in which the carriage 50 is moved in the rightward direction (the direction of arrow B in FIG. 2). On the other hand, the radiation irradiation device 190B provided on the right side of the ink jet head 52 irradiates radiation to the droplets ejected on the recording medium P during leftward scanning in which the carriage 50 is moved in the leftward direction (the direction of arrow C in FIG. 2).

The radiation irradiation devices 190A and 190B are attached to the carriage 50 and are provided with casings 194 which support respective LED irradiators 192 arranged in a line and a light source control circuit (not shown) which controls the light emission and light-off of the LED irradiators 192. As shown in FIG. 2 and FIG. 3, one LED irradiator 192 is provided for each of the radiation irradiation devices 190A and 190B, but two or more may be provided.

The LED irradiator 192 has a peak wavelength of 250 nm or more and 310 nm or less, more preferably a peak wavelength of 260 nm or more and 300 nm or less, and still more preferably a peak wavelength of 270 nm or more and 290 nm or less. The LED irradiator 192 having a peak wavelength within the range described above may cause more excellent curability due to the effective occurrence of radicals by the α-hydroxyketone-based initiator. Also, curing can be performed with less energy, and thus heat damage to the recording medium may be decreased. In addition, when the radiation irradiated from the LED irradiator has plural peak wavelengths, even one of the peak wavelengths may be within the range described above.

Examples of a commercial product of the LED irradiator include a deep ultraviolet LED irradiator (trade name, manufactured by Eye Graphics Co., Ltd., peak wavelength: 280 nm), a deep ultraviolet LED irradiator (trade name, manufactured by Micro Square Co., Ltd., peak wavelength: 285 nm and 300 nm), VM0815W-171 (trade name, manufactured by Nikkiso Co., Ltd., peak wavelength: 285 nm), surface irradiation 7×7 for evaluation (trade name, manufactured by Nikkiso Co., Ltd., peak wavelength: 265 nm, 280 nm, 285 nm, 300 nm, and 310 nm), and the like.

The wavelengths irradiated from the LED irradiators 192 may be the same or different.

As shown in FIG. 2, each of the radiation irradiation devices 190A and 190B can irradiate radiation 192a from the LED irradiator 192, which irradiates the recording medium P near the ink jet head 52, toward the droplets ejected from the ink jet head 52 and adhered to the recording medium P. Thus, at least the surfaces of the droplets can be cured to form an image on the recording medium P.

Described in detail below is a method for forming an image in a desired region by repeating plural times the ejection and the curing according to the embodiment of the disclosure.

First, radiation-curable ink jet composition droplets of one or plural colors are ejected on the recording medium P while the carriage 50 is moved in the rightward direction (direction of arrow B in FIG. 2), and the ejected ink is irradiated with radiation by the radiation irradiation device 190A. Then, sub-scanning is performed by moving the recording medium P in the sub-scanning direction SS. In the present specification, one time of main scanning in which droplets are ejected and irradiated with radiation while the carriage 50 is moved in one main scanning direction MS is referred to as "1 pass".

Then, one time of main scanning (1 pass) is further performed by ejecting droplets of one or plural colors onto the recording medium P by the method described above while moving the carriage 50 to the left direction (direction of arrow C in FIG. 2), and irradiating the ejected ink with radiation by the radiation irradiation device 190B. In this case, the ink jet composition on the recording medium is irradiated by the radiation irradiation device 190A and the radiation irradiation device 190B. Next, sub-scanning is further performed by moving the recording medium P in the sub-scanning direction SS.

In the operation described above, the coating film formed by the first pass is irradiated with radiation by one time of irradiation in the first pass and two times of irradiation in the second pass, that is, a total of three times of radiation irradiation in 2 passes. Also, the coating film formed in the second pass is irradiated with radiation in one pass, and thus irradiated one time with radiation.

The further repetition of the operation described above can form an image including an assembly of coating films in a predetermined region.

Also, the ink jet recording apparatus 20 according to the embodiment of the disclosure may further include a separate radiation irradiation unit (not shown) provided downstream in the sub-scanning direction SS which is the moving direction of the recording medium P. This can sufficiently cure the coating film up to the inside thereof on the recording medium P after all passes are finished to complete the image formation on the recording medium.

For example, when the droplets are not cured up to the insides thereof on the recording medium P due to the insufficient integrated irradiation energy irradiated from the radiation irradiation device 190A or 190B, the droplets can be securely cured up to the inside thereof by the radiation irradiation unit in the sub-scanning direction SS.

The radiation irradiation unit in the sub-scanning direction SS may be provided at a position where the droplets on the recording medium P fed in the sub-scanning direction SS can be irradiated with radiation. For example, it can be installed above the carriage 50 and downstream the ink jet head 52 (in the sub-scanning direction SS as the moving direction of the recording medium P). In addition, the same as the radiation irradiation device 190A (190B) can be used as the radiation irradiation unit in the sub-scanning direction SS.

2. Ink Jet Recording Apparatus

An ink jet recording apparatus according to an embodiment of the disclosure includes an ink jet head which ejects a radiation-curable ink jet composition containing a polymerizable compound and an α-hydroxyketone-based initiator to a recording medium, and a LED irradiator having a peak wavelength of 250 to 310 nm.

The ink jet recording apparatus according to the embodiment of the disclosure includes the LED irradiator having a peak wavelength of 250 to 310 nm, and the irradiator saves energy and thus can irradiate radiation having a peak wavelength of 250 to 310 nm while decreasing the heat damage to the recording medium. In addition, the radiation-curable ink jet composition used in the recording apparatus according to the embodiment of the disclosure contains the α-hydroxyketone-based initiator which causes little yellowing of a coating film and easily absorbs the radiation having the peak wavelength. Therefore, the ink jet recording apparatus according to the embodiment can sufficiently cure the printed coating film, decrease the heat damage to the recording medium, and prevent yellowing of the printed coating film. Also, the ink jet recording apparatus according to the embodiment includes the LED irradiator, and thus as compared with the use of a metal halide lamp or the like, the size of the radiation irradiation device can be made compact, and consequently the size of the whole of the ink jet recording apparatus can be made compact.

The ink jet recording apparatus shown in FIGS. 1 to 3 can be used as the ink jet recording apparatus according to the embodiment of the disclosure. Also, the radiation-curable ink jet composition described above can be used as the radiation-curable ink jet composition used in the ink jet recording apparatus according to the embodiment of the disclosure.

3. Examples

The present disclosure is described in further detail below by examples, but the present disclosure is not limited to these examples. Hereinafter, "%" is on mass basis unless otherwise specified.

3.1. Preparation of Ink Jet Composition

First, a pigment, a dispersant, and a base monomer (PEA) are weighed so as to provide each of the compositions described in Table 1 below and are placed in a tank for pigment dispersion. Then, a ceramic beads mill with a diameter of 1 mm is placed in the tank, followed by stirring to prepare a dispersion liquid containing the pigment dispersed in the base monomer. Then, a polymerizable compound, an initiator, a polymerization inhibitor, and a surfactant are placed in a tank for mixture serving as a stainless container and then completely dissolved by mixing and stirring. Then, the dispersion liquid prepared as described above is added and further mixed and stirred at room temperature for 1 hour. The resultant mixture is filtered with a membrane filter of 5 μm, preparing an ink jet composition of each of the examples. The numerical value of each of the components shown in the examples indicates % by mass.

TABLE 1

| | | Product name | Molecular weight | LC-1 | LC-2 | LC-3 | LC-4 | LC-5 | Wh-1 |
|---|---|---|---|---|---|---|---|---|---|
| Dispersion liquid A (cyan) | | Pigment (PB 15:3) | | 0.6 | 0.6 | 0.6 | 0.6 | 0.6 | |
| | | Dispersant | | 0.4 | 0.4 | 0.4 | 0.4 | 0.4 | |
| | | Base monomer (PEA) | | 3 | 3 | 3 | 3 | 3 | |
| Dispersion liquid B (white) | | Pigment (titanium oxide) | | | | | | | 16 |
| | | Dispersant | | | | | | | 4 |
| | | Base monomer (PEA) | | | | | | | 20 |
| Polymerizable compound | VEEA | VEEA | | 25 | 25 | 25 | 25 | 25 | 19 |
| | Monofunctional | PEA | | 26 | 26 | 26 | 26 | 26 | |
| | | IBXA | | 12.5 | 12.5 | 12.5 | 12.5 | 12.5 | 8.5 |
| | | CTFA | | | | | | | |
| | Difunctional | DPGDA | | 20 | 20 | 20 | 20 | 20 | 20 |
| | | TPGDA | | | | | | | |
| | Polyfunctional | A-DPH | | 5 | 5 | 5 | 5 | 5 | 2 |
| α- | Molecular weight | Omnirad 127 | 340 | 7 | | | | | 8 |

TABLE 1-continued

| | | | Wh-2 | Wh-3 | CL-1 | CL-2 | LC-11 | Wh-11 | Wh-12 |
|---|---|---|---|---|---|---|---|---|---|
| Hyrdoxyketone-based intitator | of 210 or more (Hydrogen abstraction type) Molecular weight of less than 210 | Omnirad 2959 | 224 | | 7 | | | | |
| | | ESACURE KIP150 | 485 | | | 7 | | | |
| | | ESACURE KIP150 | 342 | | | | 7 | | |
| | | Omnirad 184 | 204 | | | | | 7 | |
| Other initiator | Acylphosphine-based | Speedcure TPO | 348 | | | | | | |
| | | Omnirad 819 | 418.5 | | | | | | 2 |
| | α-Aminoketone-based | Omnirad 379 | 380.5 | | | | | | |
| Other component | Surfactant | BYK-UV3500 | | 0.3 | 0.3 | 0.3 | 0.3 | 0.3 | 0.3 |
| | Polymerization inhibitor | LA-7RD | | 0.02 | 0.02 | 0.02 | 0.02 | 0.02 | 0.02 |
| | | MEHQ | | 0.18 | 0.18 | 0.18 | 0.18 | 0.18 | 0.18 |

| | | Product name | Wh-2 | Wh-3 | CL-1 | CL-2 | LC-11 | Wh-11 | Wh-12 |
|---|---|---|---|---|---|---|---|---|---|
| Dispersion liquid A (cyan) | | Pigment (PB 15:3) | | | | | 2.5 | | |
| | | Dispersant | | | | | 1.5 | | |
| | | Base monomer (PEA) | | | | | 6 | | |
| Dispersion liquid B (white) | | Pigment (titanium oxide) | 16 | 16 | | | | 16 | 16 |
| | | Dispersant | 4 | 4 | | | | 4 | 4 |
| | | Base monomer (PEA) | 20 | 20 | | | | 20 | 20 |
| Polymerizable compound | VEEA Monofunctional | VEEA | 19 | 19 | 16.5 | 16.5 | 25 | 20 | 20 |
| | | PEA | | | 20 | 20 | 20 | | |
| | | IBXA | 8.5 | 8.5 | 25 | 25 | 9.5 | 7.5 | 7.5 |
| | | CTFA | | | 13 | 13 | | | |
| | Difunctional | DPGDA | 20 | 20 | 10 | 10 | 20 | 20 | 20 |
| | | TPGDA | | | | | | | |
| | Polyfunctional | A-DPH | 2 | 2 | 5 | 5 | 5 | 2 | 2 |
| α-Hyrdoxyketone-based intitator | Molecular weight of 210 or more (Hydrogen abstraction type) Molecular weight of less than 210 | Omnirad 127 | | | 8 | | | | |
| | | Omnirad 2959 | | | | | | | |
| | | ESACURE KIP150 | 8 | | | 8 | | | |
| | | ESACURE KIP150 | | 8 | | | | | |
| | | Omnirad 184 | | | | | | | |
| Other initiator | Acylphosphine-based | Speedcure TPO | | | 2 | 2 | 5 | 5 | 2 |
| | | Omnirad 819 | 2 | 2 | | | 5 | 5 | |
| | α-Aminoketone-based | Omnirad 379 | | | | | | | 8 |
| Other component | Surfactant | BYK-UV3500 | 0.3 | 0.3 | 0.3 | 0.3 | 0.3 | 0.3 | 0.3 |
| | Polymerization inhibitor | LA-7RD | 0.02 | 0.02 | 0.02 | 0.02 | 0.02 | 0.02 | 0.02 |
| | | MEHQ | 0.18 | 0.18 | 0.18 | 0.18 | 0.18 | 0.18 | 0.18 |

The description of each of the components shown in Table 1 is supplemented.

Pigment
  PB15:3 (C. I. Pigment Blue 15:3)
  Titanium oxide (C. I. Pigment White 6)
Dispersant
  For dispersion liquid A: Solsperse 36000 (trade name, manufactured by Lubrizol Corporation, polymer dispersant)
  For dispersion liquid B: BYK 180 (trade name, manufactured by BYK Chemie Japan K. K., polymer dispersant) Polymerizable compound
  VEEA (trade name, manufactured by Nippon Shokubai Co., Ltd., 2-(2-vinyloxyethoxy)ethyl acrylate)
  PEA (trade name, "Viscoat #192", manufactured by Osaka Organic Chemical Industry, Ltd., phenoxyethyl acrylate)
  IBXA (trade name, manufactured by Osaka Organic Chemical Industry Ltd., isobornyl acrylate)
  CTFA (trade name "SR531", manufactured by SARTOMER, cyclic trimethylolpropane formal acrylate)
  DPGDA (trade name "APG-100", manufactured by Shin-Nakamura Chemical Co., Ltd., dipropylene glycol diacrylate)
  TPGDA (trade name "APG-200", manufactured by Shin-Nakamura Chemical Co., Ltd., tripropylene glycol diacrylate)
  A-DHP (trade name, manufactured by Shin-Nakamura Chemical Co., Ltd., dipentaerythritol hexaacrylate)
Initiator
  Omnirad 127 (trade name, manufactured by IGM Resins B.V., 2-hydroxy-1-(4-(4-(2-hydroxy-2-methyl-propionyl)-benzyl)-phenhyl)-2-methyl-propane)
  Omnirad 2959 (trade name, manufactured by IGM Resins B.V., 1-(4-(2-hydroxyethoxy)-phenyl)-2-hydroxy-methylpropanone)
  ESACURE KIP 150 (trade name, manufactured by Lamberti Inc., oligo (2-hydroxy-2-methyl-1-(4-(1-methyl-vinyl)phenyl)propanone)
  ESACURE KIP 160 (trade name, manufactured by Lamberti Inc., 2-hydroxy-1-[4-{4-(2-hydroxy-2-methylpropanoyl)phenoxy}phenyl]-2-methylpropan-1-one)
  Omnirad 184 (trade name, manufactured by IGM Resins B.V. Inc., 1-hydroxycyclohexyl phenyl ketone)
  Speedcure TPO (trade name, manufactured by Lambson Inc., 2,4,6-trimethylbenzoyl-diphenylphosphine oxide)
  Omnirad 819 (trade name, manufactured by IGM Resins B.V. Inc., bis(2,4,6-trimethylbenzoyl)phenylphosphine oxide)

Omnirad 379 (trade name, manufactured by IGM Resins B.V. Inc., 2-dimethylamino-2-(4-methyl-benzyl)-1-(4-morpholin-4-yl-phenyl)butan-1-one) Surfactant BKY-UV3500 (trade name, manufactured by BYK Chemie Japan K.K., polyether-modified polydimethylsiloxane) Polymerization inhibitor LA-7RD (trade name, manufactured by ADEKA Corporation, 2,2,6,6-tetramethyl-4-hydroxypipeidin-1-oxyl)

MEHQ (trade name, manufactured by Kanto Chemical Co., Ltd, hydroquinone monomethyl ether)

3.2. Evaluation Method 3.2.1. Recording Test

Each of the ink jet compositions prepared as described above was filled in a line of nozzles using a modified machine of ink jet printer "PX-G5000" (trade name, manufactured by Seiko Epson Corporation) modified so as to enable recording under the curing conditions described in Table 2 and Table 3 below. A solid pattern image was printed on a PET thin film (trade name "PET50A PLsin", manufactured by Lintec Corporation) at room temperature and normal pressure so that the dot diameter of an ink was medium, and the film thickness of a printed material was 10 μm. Also, the solid pattern image was cured under the curing conditions described in Table 2 and Table 3 below, thereby forming a recorded matter having the solid pattern image printed on the PET thin film.

The "solid pattern image" is an image formed by recording a dot for every pixel which is the minimum recording unit region defined by a recording resolution.

Details of the curing conditions described in Table 2 and Table 3 below are as follows.

Curing Condition: LED-1

In the ink jet recording apparatus, "deep ultraviolet LED radiator" (trade name, manufactured by Eye Graphics Co., Ltd.) having a peak wavelength of 280 nm and an irradiation energy of 100 mW/cm$^2$ was installed as a radiation light source in a radiation irradiation device on each side of a carriage so as to have an irradiation range with a width of 210 mm. Printing was performed in 8 PASS so as to provide an integrated light amount of 260 mJ by using a modified machine of ink jet printer "PX-G5000" (manufactured by Seiko Epson Corporation) modified to a carriage speed of 1300 mm/s so as to obtain a condition of about 33 mJ per PASS.

Curing Condition: LED-2

In the ink jet recording apparatus, "surface irradiation 7×7 for evaluation" (trade name, manufactured by Nikkiso Co., Ltd.) having a peak wavelength of 310 nm and an irradiation energy of 50 mW/cm$^2$ was installed as a radiation light source in a radiation irradiation device on each side of a carriage so as to have an irradiation range with a width of 210 mm. Printing was performed in 16 PASS so as to provide an integrated light amount of 260 mJ by using a modified machine of ink jet printer "PX-G5000" (manufactured by Seiko Epson Corporation) modified to a carriage speed of 1300 mm/s so as to obtain a condition of about 17 mJ per PASS.

Curing Condition: LED-11

In the ink jet recording apparatus, "deep ultraviolet LED radiator" (trade name, manufactured by Eye Graphics Co., Ltd.) having a peak wavelength of 385 nm and an irradiation energy of 300 mW/cm$^2$ was installed as a radiation light source in a radiation irradiation device. A modified machine of ink jet printer "PX-G5000" (manufactured by Seiko Epson Corporation) was used, in which and the size of a LED panel and the distance between the LED panel and a recording medium was adjusted so that the integrated energy per PASS was 65 mJ. Then, an image was recorded in 4 PASS so as to provide an integrated light amount of 260 mJ.

Curing Condition: Metal Halide-1

In the ink jet recording apparatus, a metal halide lamp (manufactured by Eye Graphics Co., Ltd.) was used as a radiation light source in a radiation irradiation device loaded at the side of a carriage. A modified machine of ink jet printer "PX-G5000" (manufactured by Seiko Epson Corporation) was used, in which the distance between the metal halide lamp and a recording medium was adjusted so that the integrated energy per PASS was 150 mJ. Then, an image was recorded in 4 PASS so as to provide an integrated light amount of 600 mJ.

The "PASS" represents one time of operation of forming an image while scanning an ink jet head in the main scanning direction and irradiating radiation. The integrated energy [mJ] per PASS is determined from the product of the irradiation energy [mW/cm$^2$] in an irradiated surface irradiated from the light source, the irradiation continuation time per PASS, and the irradiated surface [cm$^2$] per PASS. The irradiation energy was measured by using an integrated illuminance meter corresponding each of the peak wavelengths.

TABLE 2

| | | Example 1 | Example 2 | Example 3 | Example 4 | Example 5 |
|---|---|---|---|---|---|---|
| Ink jet composition used | | LC-1 | LC-2 | LC-3 | LC-4 | LC-5 |
| Recording medium | | PET thin film | PET thin film | PET thin film | PET thin film | PET thin film |
| Condition of radiation irradiator | Curing condition | LED-1 | LED-1 | LED-1 | LED-1 | LED-1 |
| | Peak wavelength | 280 nm | 280 nm | 280 nm | 280 nm | 280 nm |
| | Light amount per PASS × Number of PASS | 33 mJ × 8 PASS | 33 mJ × 8 PASS | 33 mJ × 8 PASS | 33 mJ × 8 PASS | 33 mJ × 8 PASS |
| | Integrated light amount | 260 mJ | 260 mJ | 260 mJ | 260 mJ | 260 mJ |
| Evaluation | Curability Tackfree test | A | A | A | A | A |
| | Coating film color tone Color tone (visual) | A | A | A | A | A |
| | Heat damage Appearance (visual) | A | A | A | A | A |
| | Printed material odor Sensory test | B | B | A | A | C |

TABLE 2-continued

|  |  | Example 6 | Example 7 | Example 8 | Example 9 |
|---|---|---|---|---|---|
| Ink jet composition used | | Wh-1 | Wh-2 | Wh-3 | Wh-3 |
| Recording medium | | PET thin film | PET thin film | PET thin film | PET thin film |
| Condition of radiation irradiator | Curing condition | LED-1 | LED-1 | LED-1 | LED-2 |
| | Peak wavelength | 280 nm | 280 nm | 280 nm | 310 nm |
| | Light amount per PASS × Number of PASS | 33 mJ × 8 PASS | 33 mJ × 8 PASS | 33 mJ × 8 PASS | 17 mJ × 16 PASS |
| | Integrated light amount | 260 mJ | 260 mJ | 260 mJ | 260 mJ |
| Evaluation | Curability Tackfree test | A | A | A | B |
| | Coating film color tone Color tone (visual) | A | A | A | A |
| | Heat damage Appearance (visual) | A | A | A | A |
| | Printed material odor Sensory test | B | A | A | B |

TABLE 3

|  |  | Example 10 | Example 11 | Comparative Example 1 | Comparative Example 2 |
|---|---|---|---|---|---|
| Ink jet composition used | | CL-1 | CL-2 | LC-1 | Wh-1 |
| Recording medium | | PET thin film | PET thin film | PET thin film | PET thin film |
| Condition of radiation irradiator | Curing condition | LED-1 | LED-1 | LED-11 | LED-11 |
| | Peak wavelength | 280 nm | 280 nm | 385 nm | 385 nm |
| | Light amount per PASS × Number of PASS | 33 mJ × 8 PASS | 33 mJ × 8 PASS | 65 mJ × 4 PASS | 65 mJ × 4 PASS |
| | Integrated light amount | 260 mJ | 260 mJ | 260 mJ | 260 mJ |
| Evaluation | Curability Tackfree test | A | A | C | C |
| | Coating film color tone Color tone (visual) | A | A | Not evaluated | Not evaluated |
| | Heat damage Appearance (visual) | A | A | Not evaluated | Not evaluated |
| | Printed material odor Sensory test | B | A | Not evaluated | Not evaluated |

|  |  | Comparative Example 3 | Comparative Example 4 | Comparative Example 5 | Comparative Example 6 |
|---|---|---|---|---|---|
| Ink jet composition used | | Wh-11 | Wh-12 | LC-1 | Wh-1 |
| Recording medium | | PET thin film | PET thin film | PET thin film | PET thin film |
| Condition of radiation irradiator | Curing condition | LED-1 | LED-1 | Metal halide-1 | Metal halide-1 |
| | Peak wavelength | 280 nm | 280 nm | | |
| | Light amount per PASS × Number of PASS | 33 mJ × 8 PASS | 33 mJ × 8 PASS | 150 mJ × 4 PASS | 150 mJ × 4 PASS |
| | Integrated light amount | 260 mJ | 260 mJ | 600 mJ | 600 mJ |

TABLE 3-continued

| Evaluation | Curability | Tackfree test | A | A | A | A |
|---|---|---|---|---|---|---|
| | Coating film color tone | Color tone (visual) | B | B | A | A |
| | Heat damage | Appearance (visual) | A | A | B | B |
| | Printed material odor | Sensory test | C | B | B | B |

3.2.2. Evaluation of Curability

The printing surface of each of the recorded matters obtained as described above was determined by rubbing with a cotton swab according to evaluation criteria below. The cotton swab used was a Johnson cotton swab manufactured by Johnson & Johnson (registered trademark), Inc. The number of times of rubbing was 10 reciprocations, and the rubbing strength was 100 g load.

Evaluation Criteria

A: No rubbing mark remains.

B: Slight rubbing marks remain.

C: Clear rubbing marks remain.

3.2.3. Evaluation of Coating Film Color Tone

Each of the recorded matters obtained as described above was determined by visual observation according to the following evaluation criteria.

Evaluation Criteria

A: Yellowishness is not observed.

B: Yellowishness is observed.

3.2.4. Evaluation of Heat Damage

Each of the recorded matters obtained as described above was determined by visual observation according to the following evaluation criteria.

Evaluation Criteria

A: Determined as smooth without defects such as wrinkles or the like.

B: Wrinkles are observed.

3.2.5. Evaluation of Printed Material Odor

Each of the recorded matters obtained as described above was determined by smelling according to the following evaluation criteria.

Evaluation Criteria

A: Presence of no odor

B: Presence of slight odor

C: Presence of odor 3.3. Evaluation Results

The results of the evaluation tests are shown in Table 2 and Table 3.

The evaluation results described above indicate that in each of the examples using the LED irradiator having a peak wavelength of 250 to 310 nm and the ink jet composition containing the α-hydroxyketone-based initiator, the coating film can be prevented from yellowing and has excellent color reproducibility (coating film color tone), and heat damage to the recording medium can be prevented.

On the other hand, in Comparative Examples 1 and 2 using the ink jet composition containing the α-hydroxyketone-based initiator, but using the LED irradiator having a peak wavelength of 385 nm, a usable recorded matter is not formed because the ink is not cured. Comparative Examples 3 to 6 are poor in any one of the coating film color tone and heat damage.

The following contents can be induced from the embodiments described above.

According to an aspect, an ink jet recording method includes ejecting a radiation-curable ink jet composition to a recording medium from an ink jet head, and curing the ink jet composition ejected to the recording medium by irradiating with radiation from a LED irradiator having a peak wavelength of 250 to 310 nm to form a cured coating film. The ink jet composition contains a polymerizable compound and an α-hydroxyketone-based initiator.

In the ink jet recording method according to the aspect, the ink jet recording composition may be a white ink.

In the ink jet recording method according to the aspect, the content of a coloring material in the ink jet recording composition may be 1.2% by mass or less relative to the whole of the composition.

In the ink jet recording method according to the aspect, the molecular weight of the α-hydroxyketone-based initiator may be 210 or more.

In the ink jet recording method according to the aspect, the ink jet composition may contain as the polymerizable compound a vinyl group-containing (meth)acrylate represented by a general formula (I) below at a content of 10% by mass or more and 50% by mass or less relative to the total amount of the composition.

$$H_2C=CR^1-CO-OR^2-O-CH=CH-R^3 \qquad (I)$$

In the formula, $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

The recording medium may be a non-absorptive recording medium.

According to an aspect of the present disclosure, an ink jet recording apparatus includes an ink jet head that ejects a radiation-curable ink jet composition, containing a polymerizable compound and an α-hydroxyketone-based initiator, to a recording medium, and a LED irradiator having a peak wavelength of 250 to 310 nm.

The present disclosure is not limited to the embodiments described above, and various modifications can be made. For example, the present disclosure includes substantially the same configuration as that described in the embodiments, for example, a configuration having the same function, method, and results, or a configuration having the same object and effect. The present disclosure also includes a configuration in which a portion not essential in the configuration described in the embodiment is replaced. Further, the present disclosure includes a configuration which can exhibit the same operational effect or achieve the same object as in the configuration described in the embodiment. Further, the present disclosure includes a configuration in which a known technology is added to the configuration described in the embodiment.

What is claimed is:

1. An ink jet recording method comprising:
    ejecting a radiation-curable ink jet composition to a recording medium from an ink jet head; and
    curing the ink jet composition ejected to the recording medium by irradiating with radiation from an LED irradiator to form a cured coating film,
    wherein the ink jet composition contains a polymerizable compound and an α-hydroxyketone-based initiator has a molecular weight of 210 or more, and
    the α-hydroxyketone-based initiator includes oligo (2-hydroxy-2-methyl-1-(4-(1-methylvinyl)phenyl)propanone.

2. The ink jet recording method according to claim 1, wherein the ink jet recording composition is a white ink.

3. The ink jet recording method according to claim 1, wherein the content of a coloring material in the ink jet recording composition is 1.2% by mass or less relative to the whole of the composition.

4. The ink jet recording method according to claim 1, wherein the ink jet composition contains as the polymerizable compound a vinyl group-containing (meth)acrylate represented by a general formula (I) below at a content of 10% by mass or more and 50% by mass or less relative to the total amount of the composition, $$H_2C=CR^1-CO-OR^2-O-CH=CH-R^3 \quad (I)$$

and, in the formula, $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

5. The ink jet recording method according to claim 1, wherein the recording medium is a non-absorptive recording medium.

6. An ink jet recording apparatus comprising:
    an ink jet head that ejects a radiation-curable ink jet composition, which contains a polymerizable compound and an α-hydroxyketone-based initiator having a molecular weight of 210 or more, to a recording medium; and
    an LED irradiator,
        wherein the α-hydroxyketone-based initiator includes oligo (2-hydroxy-2-methyl-1-(4-(1-methylvinyl)phenyl)propanone.

* * * * *